United States Patent
Skovmose Kallesøe

(10) Patent No.: US 10,041,824 B2
(45) Date of Patent: Aug. 7, 2018

(54) METHOD FOR DETECTING THE FLOW RATE VALUE OF A CENTRIFUGAL PUMP

(71) Applicant: GRUNDFOS HOLDING A/S, Bjerringbro (DK)

(72) Inventor: Carsten Skovmose Kallesøe, Viborg (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 580 days.

(21) Appl. No.: 14/419,785

(22) PCT Filed: Aug. 1, 2013

(86) PCT No.: PCT/EP2013/066196
§ 371 (c)(1),
(2) Date: Feb. 5, 2015

(87) PCT Pub. No.: WO2014/023642
PCT Pub. Date: Feb. 13, 2014

(65) Prior Publication Data
US 2015/0211906 A1    Jul. 30, 2015

(30) Foreign Application Priority Data
Aug. 7, 2012  (DE) .................... 12179568.6

(51) Int. Cl.
*G01F 1/80* (2006.01)
*G01F 1/86* (2006.01)
(Continued)

(52) U.S. Cl.
CPC .......... *G01F 1/80* (2013.01); *F04D 15/0088* (2013.01); *G01F 1/86* (2013.01); *G01F 1/34* (2013.01); *G01F 1/88* (2013.01)

(58) Field of Classification Search
None
See application file for complete search history.

(56) References Cited

U.S. PATENT DOCUMENTS 4,108,574 A    8/1978  Bartley et al.
7,349,814 B2 *  3/2008  Venkatachari ...... F04D 15/0088
                                              702/45
(Continued)

FOREIGN PATENT DOCUMENTS

DE    10 2007 010768 A1    9/2007
EP     1 721 131 B1         7/2008
(Continued)

*Primary Examiner* — John Kuan
(74) *Attorney, Agent, or Firm* — McGlew and Tuttle, P.C.

(57) ABSTRACT

A method serves for detecting the flow rate of a centrifugal pump, wherein the rotation speed of the pump or of the motor driving the pump, a hydraulic variable of the pump, typically the delivery pressure and an electrical variable of the drive motor, for example the electrical power are determined, and the flow rate is evaluated by way of these variables. For this, variables dependent on the flow rate are determined by way of a mathematic linking of terms of equations describing physical relations of the pump and drive motor, wherein one term contains the rotation speed of the pump and a hydraulic variable of the pump and another term contains an electric or mechanical variable of the drive motor of the pump and the rotation speed of the pump. The flow rate is determined by way of the functional relation between the flow rate and the dependent variable.

20 Claims, 4 Drawing Sheets

(51) Int. Cl.
*G01F 1/34* (2006.01)
*G01F 1/88* (2006.01)
*F04D 15/00* (2006.01)

(56) References Cited

U.S. PATENT DOCUMENTS

| | | |
|---|---|---|
| 7,454,986 B2 | 11/2008 | Kwasny et al. |
| 2003/0129062 A1 | 7/2003 | Sabini et al. |
| 2004/0064292 A1 | 4/2004 | Beck et al. |
| 2005/0031443 A1 | 2/2005 | Ohlsson et al. |
| 2010/0083770 A1* | 4/2010 | Kock .................. G01F 1/34 73/861.357 |
| 2011/0153237 A1* | 6/2011 | Jonsson .............. F04D 15/0088 702/60 |
| 2011/0178515 A1* | 7/2011 | Bloom .................. A61B 18/14 606/33 |
| 2012/0273619 A1* | 11/2012 | Tichborne .............. B64D 39/00 244/135 A |

FOREIGN PATENT DOCUMENTS

| | | |
|---|---|---|
| EP | 2 196 678 A1 | 6/2010 |
| GB | 2 313 197 A | 11/1997 |
| WO | 2005/085772 A1 | 9/2005 |

\* cited by examiner

METHOD FOR DETECTING THE FLOW RATE VALUE OF A CENTRIFUGAL PUMP

CROSS REFERENCE TO RELATED APPLICATIONS

This application is a United States National Phase Application of International Application PCT/EP2013/066196 filed Aug. 1, 2013 and claims the benefit of priority under 35 U.S.C. § 119 of European Patent Application EP 12179568.6 filed Aug. 7, 2012, the entire contents of which are incorporated herein by reference.

FIELD OF THE INVENTION

The invention relates to a method for detecting the flow rate (flow volume) of a centrifugal pump, with which the flow rate is determined by way of the rotational speed of the pump, a hydraulic variable of the pump and an electrical variable of the drive motor of the pump.

BACKGROUND OF THE INVENTION

With centrifugal pumps, it is counted as belonging to the state of the art, to detect the pressure, the differential pressure and for example the temperature within the pump by way of sensors. Moreover, the electrical variables of the drive motor such as power and rotational speed are available in any case, since modern centrifugal pumps are typically controlled by way of a frequency converter, wherein the rotational speed can also be detected by sensor without any problem. In contrast, the flow measurement requires more effort, since mechanical flow meters are expensive and prone to malfunctioning, and electronic detection systems in contrast are quite expensive and therefore are less suitable in particular for pumps of a small and medium construction.

Basically, the flow rate of a centrifugal pump can be determined in a speed-dependent manner and specifically selectively with a hydraulic pump model which in dependence on the rotational speed and the delivery head, specifies the flow rate, or with the help of an electrical-hydraulic model, with which the flow rate is determined in a manner depending on the speed and the drive power. The former model however has the disadvantage that it provides inaccurate or ambiguous flow rate results in the region of low delivery rates. The latter in contrast is unsuitable for determining large flow rates, since with a high electrical power it provides inaccurate or ambiguous results.

For this reason, it is counted as belonging to the state of the art, to combine these methods, wherein the electrical-hydraulic model is applied for the region of smaller delivery rates and the hydraulic pump model for the region of large delivery rates. This, however, results to jumps being able to arise in the region, in which one changes from the one method to the other method and vice versa, and these jumps are not desirable. Moreover, it is also possible that the regions can overlap or have a gap. This can lead to oscillation problems and as a whole this is not favorable.

It is counted as belonging to the state of the art from U.S. Pat. No. 7,454,986 B2, to determine the throughput by way of electrical variables of the motor, wherein the flow rate is determined by way of values stored in tabular form, by way of the phase shift between the supply voltage and the back-EMF.

It is counted as belong to the state of the art from EP 1 721 131 B1, to determine the throughput by way of both above-mentioned methods, wherein the evaluation is effected by way of values stored in tabular form.

From GB 2 313 197 A, it is counted as belonging to the state of the art, to determine the flow rate by way of the pump pressure, thus the delivery head, from the power or from the efficiency. For the regions, in which one of these types of evaluation leads to inaccurate or ambiguous results, then one of the other modules is to be used or the flow rate is to be determined by way of forming averages of two methods.

SUMMARY OF THE INVENTION

Against this background, it is an object of the invention to design a method of the known type for detecting the flow rate of a centrifugal pump, such that an as accurate as possible detection of the flow rate is effected over the complete speed range of the pump without additional sensor means and with simple technical means.

The method according to the invention, for detecting the flow rate of a centrifugal pump detects the speed of the pump, a hydraulic variable of the pump and an electrical variable of the drive motor of the pump. Thereby, according to the invention, a variable dependent on the flow rate is determined by way of a mathematical linkage of terms of equations describing the physical relations of the pump and drive motor, of which one term contains the speed of the pump and a hydraulic variable of the pump and another term contains an electrical or mechanical variable of the drive motor of the pump and the rotational speed of the pump. The flow rate is then determined by way of a functional relation between the flow rate and the dependent variable.

The basic concept of the present invention is to produce an auxiliary variable or to produce an auxiliary function which is in an unambiguous and linear relation with the flow rate, on account of a suitable selection and linking of such equation terms, and finally by way of this, to determine the flow rate. Thereby advantageously, by way of iteration methods which are yet described by way of example further below, the actual flow rate can be determined quite accurately without requiring the detection of further variables. The method according to the invention, thus with the given variables, leads to an unambiguous and more accurate evaluation of the current flow rate through the pump, compared to the state of the art.

Particularly advantageously, thereby a variable y is selected as a dependent variable, which is determined by the equation $$Y = -a * \frac{H}{n} + b * \frac{P}{n^2}$$

and in which a and b are constants to be determined, H the delivery head, P the electric power of the drive motor and n the rotational speed. With this equation, it is the case of the subtractive linking of two terms, specifically a term which contains the electric variable in the form of the power of the drive motor of the pump and the speed, and another term which contains a hydraulic variable, specifically the delivery head and the speed of the pump. The previously mentioned dependent variable is simple to determine by calculation and is in a linear relation with the flow rate and delivery rate, so that the flow rate can be determined in a simple manner by way of the functional relation between the flow rate and this dependent variable.

Particularly advantageously, a pressure variable, in particular the pressure at the exit of the pump (also indicated as the delivery head) or the differential pressure between the entry and the exit of the pump is selected as a hydraulic variable. The pressure measurement or differential pressure measurement with pumps is nowadays already standard practice, even with pumps of a small power. Such pressure sensors or differential pressure sensors can be manufactured inexpensively and can be built within the pump.

A power-dependent variable, preferably the taken-up power P of the drive motor and which as a rule is available without further ado via the electronic control of the frequency converter, has been found to be advantageous as an electrical variable.

As an alternative to the electrical variable of the drive motor, as explained further above, a mechanical variable of the drive motor of the pump can also be used. The torque of the motor which can typically be determined numerically but also by way of e.g. strain gauges is particularly suitable as a mechanical variable.

Basically there are numerous possibilities of mathematically linking the terms. It is particularly advantageous if with regard to the linking it is the case of an addition or subtraction of at least two terms, since such a linking demands comparatively little computation effort.

According to an advantageous further development of the invention, the mathematical linking can contain one or more further terms which are constant or speed-dependent. Several such terms can also be provided, of which for example one is constant and one speed-dependent which is to say rotational-speed dependent.

It is particularly favorable if the selection of the terms, their number and their mathematical linking are selected such that a monotonous function of the flow rate is formed over the operating range of the pump, since then an unambiguous and mathematically well assignable flow rate to the dependent variable exists. The flow rate can advantageously also be determined by way of a dependent variable Y which represents a subtractive linking of three terms:

$$Y = -a * \frac{H}{n} + b * \frac{P}{n^2} - c * n$$

wherein c is a constant to be determined.

Thereby, it has found to be advantageous to lead the signal representing the flow rate through a low-pass filter, so that these higher-frequency interference signals which have practically no influence on the flow rate are eliminated.

Although the flow rate can be determined by way of the dependent variable, for example by way of storing in the form of tables, however the determined dependent variable Y is advantageously compared to a corresponding dependent variable $y_{est}$ which is determined by model computation, and this method is repeated by way of variation of an assumed flow rate $Q_{est}$ until an error variable $y-y_{est}$ is so small that the assumed flow rate $Q_{est}$ corresponds to the actual flow rate Q. This iteration method permits the flow rate to be able to be determined with a high accuracy and in any case significantly more accurately that this can be effected with a tabular comparison of previously determined values. Thereby, it is particularly advantageous if the rotational speed forms an input variable also for the model computation, since the rotational speed is the variable which can be determined most simply and with a high accuracy.

According to a further development of the invention, the error variable $y-y_{est}$ can be summed over time; in particular integrated, wherein the summed value represents the flow rate Q.

Advantageously, the previously described method is carried out for detecting the flow rate of the pump by way of an electronic control which is part of the centrifugal pump with its electrical drive motor and with a pressure sensor or differential pressure sensor. Such a design has the advantage that within the centrifugal pump assembly, the flow rate is available independently of external sensors, thus can be determined in a pump-autarkic manner. This in turn can serve for monitoring purposes of the pump but also for the control of the pump and also for the control of external procedures.

Advantageously, such an electronic control comprises an observer-based closed-loop control, in order in this manner to realize a high accuracy of the determined results.

The invention is hereinafter explained in more detail by curve courses and block diagrams. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
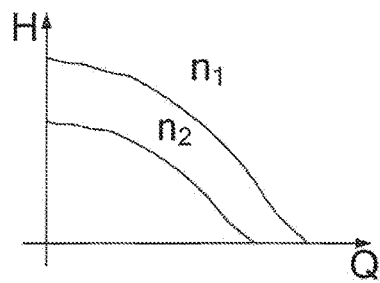
FIG. 1 is a graph showing the dependence of the flow rate and delivery head with two different speeds of a centrifugal pump.
Figure 2:
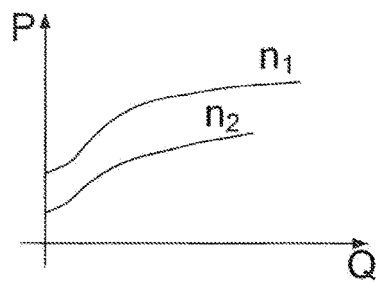
FIG. 2 is a graph showing the dependence of the flow rate and power uptake of the pump of FIG. 1, at comparable speeds.
Figure 3:
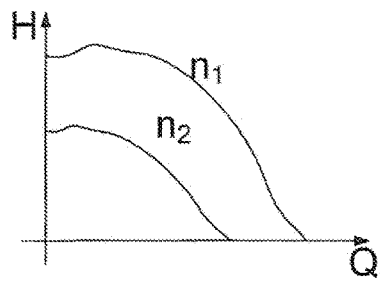
FIG. 3 is a graph showing the dependence of the flow rate and delivery head at two different speeds of a centrifugal pump with an instable characteristic curve.
Figure 4:
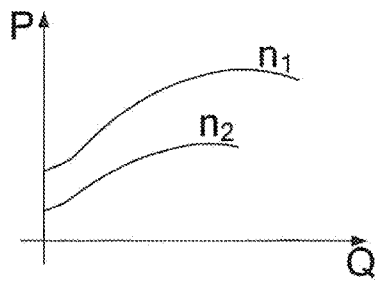
FIG. 4 is a graph showing the dependence of flow rate and power uptake of the pump of FIG. 3, at comparable speeds.

By way of FIGS. 1 and 2, the functional relationship between the delivery head (delivery pressure) and the flow rate (delivery rate) Q of a centrifugal pump is represented by way of FIG. 1, and between the taken-up power P and flow rate Q by way of FIG. 2, for two rotational speeds. As the curve courses illustrate, in FIG. 1, thus, in the HQ diagram, the curve is quite flat with low flow rates, wherein in FIG. 2 in the PQ diagram, in contrast, they become flat towards larger flow rates. The evaluation of the flow rate is difficult and in practice quite inaccurate where the curves are flat. This problem is amplified even more with pumps with an instable characteristic curve, as is illustrated by the comparable diagrams of FIGS. 3 and 4. Thus, in FIG. 3, at a constant speed $n_1$ one is to find two delivery heads H, to which different flow rates Q are assigned. The same results in FIG. 4. With such pumps therefore, the evaluation of the flow rate merely by way of a HQ or a PQ diagram is not only inaccurate, but is not even possible at all in some regions due to the ambiguity.

The present invention solves this problem by way of a variable dependent on the flow rate and which is here called Y by way of example, being determined by way of mathematically linking terms of equations describing physical relations of the pump and drive motor. Thereby, in order to circumvent the initially outlined problems, the selection of the terms of the equations which describe the physical relations of the pump and drive motor, is such that one term contains the speed of the pump and a hydraulic variable of the pump, and another term contains an electrical or mechanical variable of the drive motor of the pump and the rotational speed of the pump. These terms thus at least partly reflect the previously described diagrams according to FIGS. 1 and 2 or 3 and 4. By way of a suitable mathematical linking of these terms which are part of the respective pump models/motor models, one can form a so-called auxiliary variable, specifically a variable Y dependent on the flow rate, and this variable has a functional relation with the flow rate and specifically where possible has such a relation that an unambiguous, well differentiatable assignment to the flow rate is possible at each point of the operating range of the pump. Such a variable Y can for example be formed as follows:

$$Y = -a * \frac{H}{n} + b * \frac{P}{n^2} \qquad \text{(equation 1)}$$

In this equation, a and b are constants to be determined, H the delivery head or the delivery pressure, P the electrical power of the drive motor and n the rotational speed of the pump and motor. This variable thus contains the delivery head and the rotational speed and a second term which contains the power and rotational speed.

The functional relation of this variable Y to the flow rate results from the following equation:

$$Y = k_2 * \frac{Q^2}{n} + k_1 * Q + k_0 * n. \qquad \text{(equation 2)}$$

Figure 5:
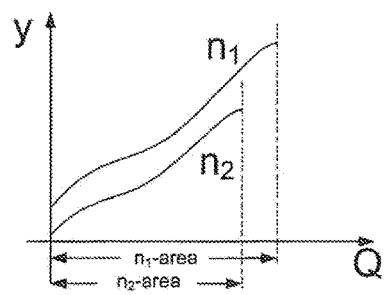
FIG. 5 is a graph showing the dependence of a dependent variable Y on the flow rate Q, at two different speeds.

This equation results from the known physical relations of the motor and pump, wherein the constants $k_2$, $k_1$ and $k_0$ are determined beforehand in a manner known per se. This functional relationship is represented schematically by way of FIG. 5. As this figure illustrates, an unambiguous assignment between Y and Q results from this, i.e. between the determined variable and the flow rate to be determined, in dependence on the respective speed.

In order now with the evaluated Y, to determine the flow rate, it is useful to apply an iteration method, with which an estimated flow rate $Q_{est}$ is inputted into the equation 2, given a known rotation speed (n), from which a variable $Y_{est}$ is determined. Thereby, the variable $Q_{est}$ which is put into the equation 2 is changed for so long until $Y_{est}=Y$, i.e. is equal to the variable determined by way of the equation 1. If this is the case, and the difference between Y and $Y_{est}$ is equal to 0, then the estimated flow rate $Q_{est}$ corresponds to the actual flow rate Q. This method is possible on the one hand with a low computation effort and on the other hand has a high accuracy, wherein typically only one value, specifically the delivery pressure or the delivery head or the differential pressure between the entry and exit of the pump needs to be determined by way of sensor, whereas the rotational speed and the electrical power are available in any case on the part of the control electronics. With a suitable selection of the terms and a suitable selection of the mathematical linking which may not only be additive or subtractive, but also of a higher order, an auxiliary variable Y is determined, for which the flow rate Y is determined in a simple but unambiguous manner, without the initially mentioned disadvantages with the state of the art occurring.

Figure 6:
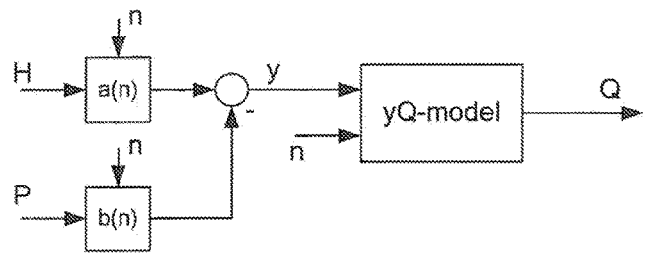
FIG. 6 is a block diagram of a first embodiment of the method according to the invention.

The previously described embodiment example, with which one term comprises the delivery head and the rotational speed and another term the electrical power and the rotational speed, and are subtractively linked into a variable Y, in order then to be linked by way of a YQ model amid the use of the current rotation speed for determining the flow rate, is represented schematically by way of FIG. 6.

Figure 7:
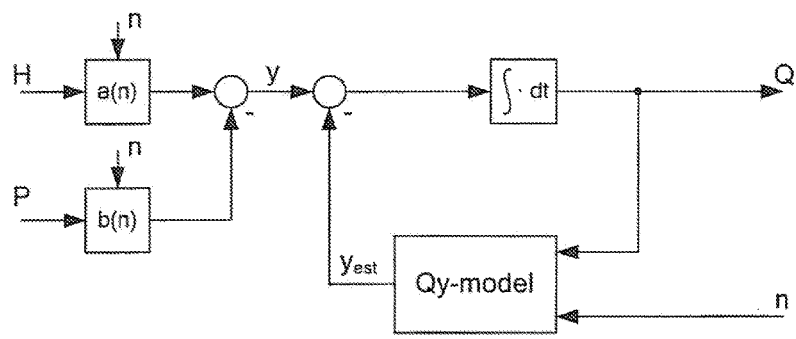
FIG. 7 is a block diagram of a second embodiment of the method according to the invention.

FIG. 7 shows a further development of the method represented by way of FIG. 6 to the extent that an integration, i.e. a summing over time is effected via the difference between the Y determined by measurement and the Y, determined by initial estimation, and this integration then directly indicates the flow rate Q. Here too, the rotational speed as an input variable as well as the difference $Y_{est}$ integrated over the time is included in the QY model.

Figure 8:
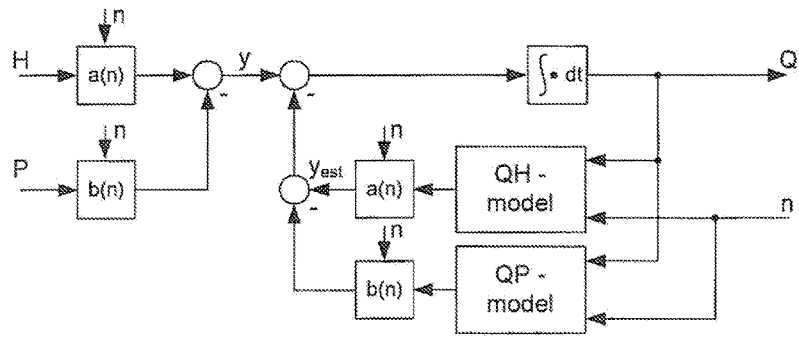
FIG. 8 is a block diagram of an alternative embodiment of the method according to the invention.

It is shown by way of FIG. 8, as to how, by way of the variable Y and by way of a hydraulic pump model (QH model) as well as by way of an electric-hydraulic motor model/pump model (QP model), the terms and thus a $Y_{est}$ is determined, which then in turn is subtractively linked to the measured and computed value Y, in order then further to determine the flow rate by way of integration, in an analogous manner to the embodiment example described by way of FIG. 7.

Figure 9:
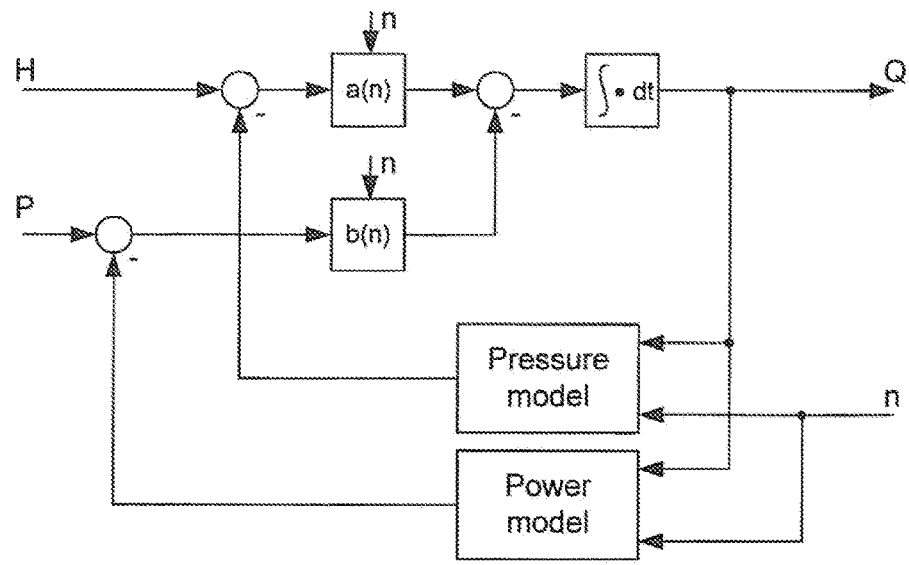
FIG. 9 is a block diagram of a further embodiment of a method according to the invention.

It is schematically represented by way of FIG. 9 that the mathematic linking between the measured variables H and P with the variables which are estimated for the purpose of the iteration method can already flow into the computation of Y.

Figure 10:
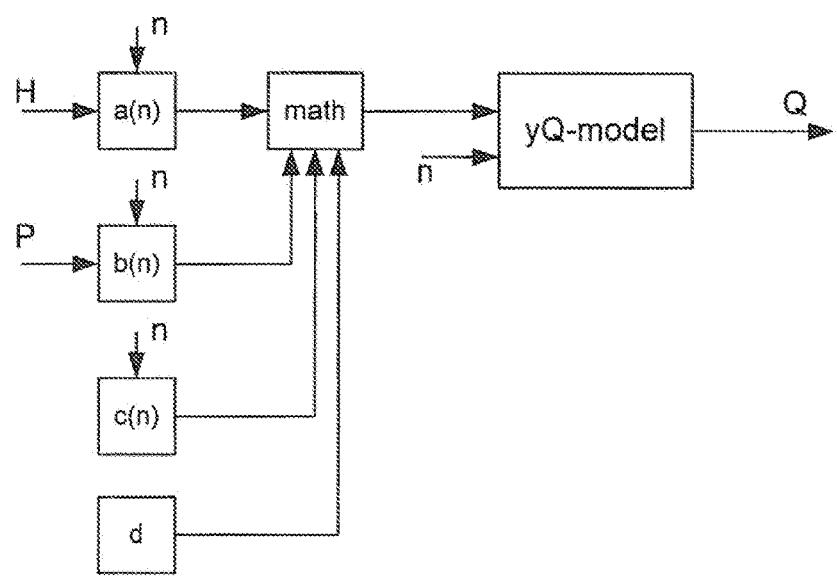
FIG. 10 is a block diagram which represents the basic construction of the method according to the invention.

It is shown by way of FIG. 10 that the variable Y does not necessarily need to consist of two terms, as described initially by way of the embodiment example, but can have further terms dependent on the flow rate, or constant terms. With the embodiment example according to FIG. 10, a third flow-rate-dependent term c(n) is envisaged, as well as a fourth constant term d. From this, the variable Y can be determined for example as follows:

$$Y = -a * H + b * \frac{P}{n} - \frac{c}{n^2} + d \qquad \text{(equation 3)}$$

wherein c and d are constants to be determined.

Figure 11:
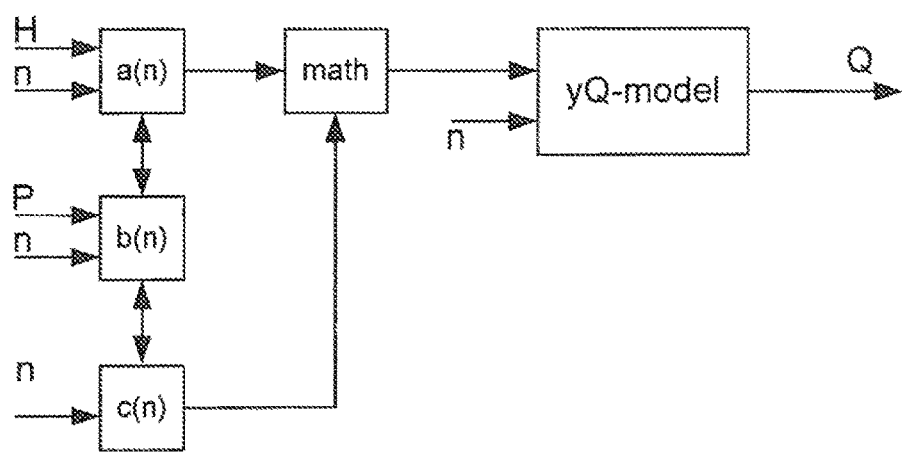
FIG. 11 is a block diagram of the method according to the invention, with which the dependent variable is formed from three terms.
Figure 12:
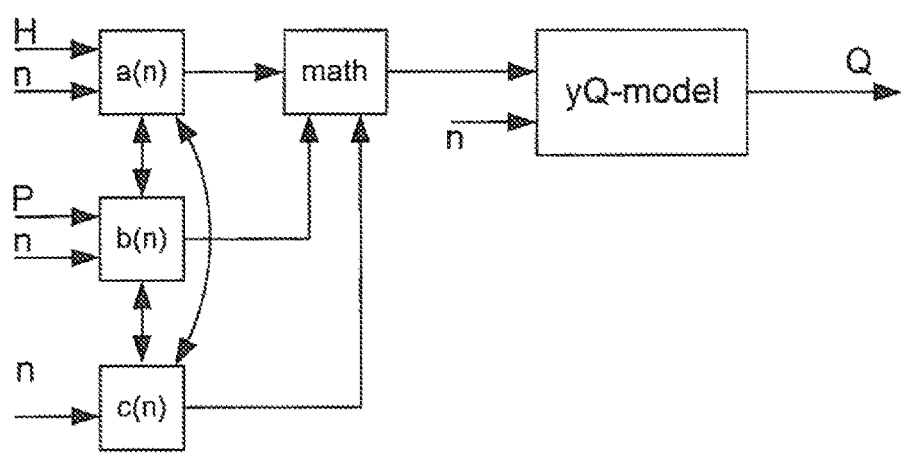
FIG. 12 is a block diagram of a modified method according to FIG. 11.

An auxiliary variable consisting of three terms is represented by way of FIG. 11 and these terms are in each case dependent on the flow rate. Thereby, the terms can be linked amongst one another before their mathematic linking, i.e. be dependent on one another, as is indicated by the double arrow between a(n) and c(n) in the embodiment example according to FIG. 12.

While specific embodiments of the invention have been shown and described in detail to illustrate the application of the principles of the invention, it will be understood that the invention may be embodied otherwise without departing from such principles.

The invention claimed is:

1. A method for controlling a flow rate of a centrifugal pump, the method comprising:
   providing a centrifugal pump comprising an inlet and an outlet;
   measuring a pressure at at least one of the inlet and the outlet;
   determining a hydraulic variable of the pump based on the pressure measured at at least one of the inlet and the outlet;
   determining the flow rate of the centrifugal pump by way of a rotation speed of the pump and the hydraulic variable of the pump and an electrical variable of a drive motor of the pump, wherein:
   a variable which is dependent on the flow rate is determined by way of a mathematic linking of terms of equations describing physical relations of the centrifugal pump and the drive motor, the terms comprising one term that contains the rotation speed of the pump and the hydraulic variable of the pump and another term that contains an electrical or mechanical variable of the drive motor of the centrifugal pump and the rotation speed of the pump; and
   the flow rate is determined by way of a functional relation between the flow rate and the dependent variable;
   comparing the dependent variable (y) determined to a corresponding dependent variable ($y_{est}$) determined by way of model computation, and repeating the comparison by way of variation of an assumed flow rate ($Q_{est}$), until an error variable ($y-y_{est}$) is small such that the assumed flow rate ($Q_{est}$) corresponds to the flow rate (Q);
   controlling the flow rate of the centrifugal pump by an electronic closed-loop control based on the assumed flow rate.

2. A method according to claim 1, wherein the dependent variable is a variable (Y) which is determined by way of the following equation $$Y = -a*\frac{H}{n} + b*\frac{P}{n^2}$$

in which
a and b are constants to be determined,
H the delivery head,
P the electrical power of the drive motor and
n the rotation speed.

3. A method according to claim 1, wherein the hydraulic variable is a pressure variable, which corresponds to the pressure at the outlet of the pump or a differential pressure between the inlet and the outlet of the pump.

4. A method according to claim 1, wherein the electrical variable is a power-dependent variable, a taken-up power (P) of the drive motor.

5. A method according to claim 1, wherein the mechanical variable is a torque of the motor.

6. A method according to claim 1, wherein the mathematical linking is an addition or subtraction of at least two terms.

7. A method according to claim 1, wherein the mathematic linking contains one or more further terms which are constant or dependent on the rotation speed.

8. A method according to claim 1, wherein the terms, the number of terms and the linking of terms are selected such that a monotonous function of the flow rate is formed over a working range of the pump.

9. A method according to claim 1, wherein the flow rate is determined by way of a dependent variable (Y), wherein $$Y = -a*\frac{H}{n} + b*\frac{P}{n^2} - c*n$$

where a and b are constants to be determined, c is a constant to be determined,
H the delivery head,
P the electrical power of the drive motor and
n the rotation speed.

10. A method according to claim 1, wherein a signal representing the flow rate is filtered with a low-pass filter.

11. A method according to claim 1, further comprising:
    providing a pressure sensor;
    sensing a hydraulic pressure of the pump with the pressure sensor, the hydraulic variable comprising the hydraulic pressure.

12. A method according to claim 1, wherein the rotation speed forms an input variable in the model computation.

13. A method according to claim 1, wherein the error variable ($y-y_{est}$) is summed over time or integrated, and the summed or integrated value represents the flow rate (Q).

14. A centrifugal pump comprising:
    an electric drive motor;
    a pressure sensor or differential pressure sensor detecting a pressure at one or more of an inlet and an outlet of the centrifugal pump; and
    an electronic control, wherein the electronic control is configured for determining a hydraulic variable based on the pressure measured at one or more of the inlet and the outlet of the centrifugal pump, the electronic control being further configured for determining a flow rate of the centrifugal pump by way of a rotation speed of the pump and the hydraulic variable of the pump and an electrical variable of the electric drive motor of the pump, wherein the electronic control:
    determines a variable which is dependent on the flow rate by way of a mathematic linking of terms of equations describing physical relations of the centrifugal pump and the drive motor, the terms comprising one term that contains the rotation speed of the pump and the hydraulic variable of the pump and another term that contains an electrical or mechanical variable of the drive motor of the centrifugal pump and the rotation speed of the pump;
    determines the flow rate by way of a functional relation between the flow rate and the dependent variable;
    compares the dependent variable (y) determined to a corresponding dependent variable ($y_{est}$) determined by way of model computation, and repeating the comparison by way of variation of an assumed flow rate ($Q_{est}$), until an error variable ($y-y_{est}$) is small such that the assumed flow rate ($Q_{est}$) corresponds to the flow rate (Q);

controls the flow rate of the centrifugal pump by an electronic closed-loop control based on the assumed flow rate.

15. A centrifugal pump according to claim 14, wherein the electronic control has an observer-based closed-loop control.

16. A centrifugal pump according to claim 14, wherein the dependent variable is a variable (Y) which is determined by way of the following equation:

$$Y = -a*\frac{H}{n} + b*\frac{P}{n^2}$$

in which
a and b are constants to be determined,
H the delivery head,
P the electrical power of the drive motor and
n the rotation speed.

17. A centrifugal pump according to claim 14, wherein:
the hydraulic variable is a pressure variable, which corresponds to the pressure at the outlet of the pump or a differential pressure between the inlet and the outlet of the pump;
the electrical variable is a power-dependent variable representing a taken-up power of the drive motor; and
the mechanical variable is a torque of the motor.

18. A centrifugal pump according to claim 14, wherein the flow rate is determined by way of a dependent variable (Y), wherein $$Y = -a*\frac{H}{n} + b*\frac{P}{n^2} - c*n$$

where a, b and c are constants to be determined,
H the delivery head,
P the electrical power of the drive motor and
n the rotation speed.

19. A centrifugal pump according to claim 14, wherein the pressure sensor detects a hydraulic pressure of the pump, the hydraulic variable comprising the hydraulic pressure.

20. A centrifugal pump according to claim 14, wherein:
the rotation speed forms an input variable in the model computation; and
the error variable ($y-y_{est}$) is summed over time or integrated, and the summed or integrated value represents the flow rate (Q).

* * * * *